(12) United States Patent
Lubart et al.

(10) Patent No.: US 8,226,253 B2
(45) Date of Patent: Jul. 24, 2012

(54) CONCENTRATORS FOR SOLAR POWER GENERATING SYSTEMS

(76) Inventors: Neil D. Lubart, Austin, TX (US); Thomas E. Lash, Shaker Heights, OH (US); Timothy J. Wojciechowski, Westlake, OH (US)

( * ) Notice: Subject to any disclaimer, the term of this patent is extended or adjusted under 35 U.S.C. 154(b) by 581 days.

(21) Appl. No.: 12/395,306

(22) Filed: Feb. 27, 2009

(65) Prior Publication Data

US 2009/0235985 A1    Sep. 24, 2009

Related U.S. Application Data

(60) Provisional application No. 61/031,750, filed on Feb. 27, 2008, provisional application No. 61/095,357, filed on Sep. 9, 2008.

(51) Int. Cl.
*G02B 5/10*      (2006.01)
(52) U.S. Cl. ........................................................ 359/853
(58) Field of Classification Search .................. 359/853; 126/600, 684
See application file for complete search history.

(56) References Cited

U.S. PATENT DOCUMENTS

| | | |
|---|---|---|
| 1,253,138 A | 1/1918 | Brewster |
| 3,707,416 A | 12/1972 | Stevens |
| RE27,617 E | 4/1973 | Olsen |
| 3,791,722 A | 2/1974 | Ahlberg et al. |
| 3,809,686 A | 5/1974 | Chandross et al. |
| 3,919,559 A | 11/1975 | Stevens |
| 3,936,157 A | 2/1976 | Kapany |
| 3,985,116 A | 10/1976 | Kapany |
| 3,993,485 A | 11/1976 | Chandross et al. |
| 4,040,727 A | 8/1977 | Ketchpel |
| 4,056,404 A | 11/1977 | Garone et al. |
| 4,093,356 A | 6/1978 | Bigelow |

(Continued)

FOREIGN PATENT DOCUMENTS

AU    2000226369 B2    2/2000

(Continued)

OTHER PUBLICATIONS

International Search Report and Written Opinion dated Jan. 25, 2005 for PCT/US2004/15796.

(Continued)

*Primary Examiner* — Euncha Cherry
(74) *Attorney, Agent, or Firm* — Pepper Hamilton LLP

(57) ABSTRACT

The invention is directed to a system for concentrating light for solar thermal and solar photovoltaic generating systems. The system includes a plurality of concentrating regions. Each concentrating region includes an input end having a perimeter or width in a lenticular configuration, an output end having a perimeter or width in a lenticular configuration, and a portion located therebetween defined by a reflective boundary. The invention is also directed to a method of manufacturing a light collection system. The method includes forming a film having multiple recesses. Each recess includes an input end, an output end and a reflective boundary. The output end has a smaller perimeter or a width in a lenticular configuration than a perimeter or a width of the input end in the lenticular configuration.

11 Claims, 6 Drawing Sheets

U.S. PATENT DOCUMENTS

| | | |
|---|---|---|
| 4,196,973 A | 4/1980 | Hochstrate |
| 4,268,127 A | 5/1981 | Oshiima et al. |
| 4,315,258 A | 2/1982 | McKnight et al. |
| 4,398,805 A | 8/1983 | Cole |
| 4,436,377 A | 3/1984 | Miller |
| 4,459,182 A | 7/1984 | te Velde |
| 4,541,692 A | 9/1985 | Collins et al. |
| 4,542,449 A | 9/1985 | Whitehead |
| 4,545,648 A | 10/1985 | Shulman et al. |
| 4,621,898 A | 11/1986 | Cohen |
| 4,636,786 A | 1/1987 | Haertling |
| 4,637,687 A | 1/1987 | Haim et al. |
| 4,712,854 A | 12/1987 | Mikami et al. |
| 4,748,546 A | 5/1988 | Ukrainsky |
| 4,754,275 A | 6/1988 | Abbaticchio et al. |
| 4,799,137 A | 1/1989 | Aho |
| 4,813,765 A | 3/1989 | Negishi |
| 4,832,459 A | 5/1989 | Harper et al. |
| 4,863,224 A | 9/1989 | Afian et al. |
| 4,936,659 A | 6/1990 | Anderson et al. |
| 5,028,105 A | 7/1991 | Drexhage et al. |
| 5,048,931 A | 9/1991 | Magocs |
| 5,049,481 A | 9/1991 | Okamoto et al. |
| 5,054,872 A | 10/1991 | Fan et al. |
| 5,067,404 A | 11/1991 | Frunder et al. |
| 5,130,827 A | 7/1992 | Pavone et al. |
| 5,136,677 A | 8/1992 | Drexhage et al. |
| 5,146,355 A | 9/1992 | Prince et al. |
| 5,204,160 A | 4/1993 | Rouser |
| 5,220,462 A | 6/1993 | Feldman, Jr. |
| 5,226,105 A | 7/1993 | Myers |
| 5,291,184 A | 3/1994 | Iino |
| 5,309,544 A | 5/1994 | Saxe |
| 5,339,179 A | 8/1994 | Rudisill et al. |
| 5,394,255 A | 2/1995 | Yokota et al. |
| 5,396,350 A | 3/1995 | Beeson et al. |
| 5,428,468 A | 6/1995 | Zimmerman et al. |
| 5,452,385 A | 9/1995 | Izumi et al. |
| 5,467,208 A | 11/1995 | Kokawa et al. |
| 5,479,275 A | 12/1995 | Abileah |
| 5,481,445 A | 1/1996 | Sitzema et al. |
| 5,503,902 A | 4/1996 | Steenblik et al. |
| 5,541,039 A | 7/1996 | McFarland et al. |
| 5,541,247 A | 7/1996 | Koike |
| 5,550,657 A | 8/1996 | Tanaka et al. |
| 5,557,295 A | 9/1996 | Miyashita et al. |
| 5,573,889 A | 11/1996 | Hofmann et al. |
| 5,594,830 A | 1/1997 | Winston et al. |
| 5,596,143 A | 1/1997 | Hashimoto |
| 5,598,281 A | 1/1997 | Zimmerman et al. |
| 5,626,800 A | 5/1997 | Williams et al. |
| 5,645,973 A | 7/1997 | Hofmann et al. |
| 5,647,040 A | 7/1997 | Modavis et al. |
| 5,655,827 A | 8/1997 | Kaneko et al. |
| 5,661,839 A | 8/1997 | Whitehead |
| 5,668,614 A | 9/1997 | Chien et al. |
| 5,684,551 A | 11/1997 | Nakamura et al. |
| 5,686,879 A | 11/1997 | Schuhl et al. |
| 5,686,979 A | 11/1997 | Weber et al. |
| 5,706,065 A | 1/1998 | Yano |
| 5,739,931 A | 4/1998 | Zimmerman et al. |
| 5,751,871 A | 5/1998 | Krivoshlykov et al. |
| 5,754,262 A | 5/1998 | Lengyel |
| 5,761,354 A | 6/1998 | Kuwano et al. |
| 5,761,355 A | 6/1998 | Kuper et al. |
| 5,761,364 A | 6/1998 | Knapp et al. |
| 5,781,342 A | 7/1998 | Hannon et al. |
| 5,783,340 A | 7/1998 | Farino et al. |
| 5,807,906 A | 9/1998 | Bonvallot et al. |
| 5,838,403 A | 11/1998 | Jannson et al. |
| 5,839,812 A | 11/1998 | Ge et al. |
| 5,839,823 A | 11/1998 | Hou et al. |
| 5,870,176 A | 2/1999 | Sweatt et al. |
| 5,881,201 A | 3/1999 | Khanarian |
| 5,889,570 A | 3/1999 | Mitsui et al. |
| 5,920,367 A | 7/1999 | Kajimoto et al. |
| 5,926,203 A | 7/1999 | Shimura et al. |
| 5,926,601 A | 7/1999 | Tai et al. |
| 5,929,956 A | 7/1999 | Neijzen et al. |
| 5,949,506 A | 9/1999 | Jones et al. |
| 5,956,107 A | 9/1999 | Hashimoto et al. |
| 5,963,284 A | 10/1999 | Jones et al. |
| 5,963,687 A | 10/1999 | Schneider |
| 5,985,084 A | 11/1999 | Summersgill et al. |
| 5,986,730 A | 11/1999 | Hansen et al. |
| 5,989,776 A | 11/1999 | Felter et al. |
| 5,998,096 A | 12/1999 | Umemoto et al. |
| 6,002,829 A | 12/1999 | Winston et al. |
| 6,007,963 A | 12/1999 | Felter et al. |
| 6,008,871 A | 12/1999 | Okumura |
| 6,010,747 A | 1/2000 | Beeson et al. |
| 6,011,601 A | 1/2000 | Kojima |
| 6,025,897 A | 2/2000 | Weber et al. |
| 6,027,222 A | 2/2000 | Oki et al. |
| 6,030,540 A | 2/2000 | Yamamoto et al. |
| 6,044,196 A | 3/2000 | Winston et al. |
| 6,078,421 A | 6/2000 | Davey et al. |
| 6,080,477 A | 6/2000 | Narasimhan |
| 6,097,871 A | 8/2000 | DeDobbelaere et al. |
| 6,147,725 A | 11/2000 | Yuuki et al. |
| 6,195,140 B1 | 2/2001 | Kubo et al. |
| 6,220,058 B1 | 4/2001 | Koyama et al. |
| 6,368,775 B1 | 4/2002 | Potter et al. |
| 6,398,370 B1 | 6/2002 | Chiu et al. |
| 6,473,220 B1 | 10/2002 | Clikeman et al. |
| 6,600,535 B1 | 7/2003 | Tsuda et al. |
| 6,646,813 B2 | 11/2003 | Falicoff et al. |
| 6,707,518 B1 | 3/2004 | Cowan |
| 6,759,113 B1 | 7/2004 | Tang |
| 6,766,076 B2 | 7/2004 | Nakama et al. |
| 6,788,470 B2 | 9/2004 | Chen et al. |
| 6,819,465 B2 | 11/2004 | Clikeman et al. |
| 6,903,788 B2 | 6/2005 | Shiraogawa et al. |
| 6,919,981 B2 | 7/2005 | Clikeman et al. |
| 7,236,286 B2 | 6/2007 | Clikeman et al. |
| 7,345,824 B2 | 3/2008 | Lubart et al. |
| 7,428,367 B2 | 9/2008 | Lubart et al. |
| 7,480,101 B2 | 1/2009 | Lubart et al. |
| 7,518,801 B2 | 4/2009 | Davis et al. |
| 7,573,550 B2 | 8/2009 | Lubart et al. |
| 7,573,642 B2 | 8/2009 | Lubart et al. |
| 7,595,934 B2 | 9/2009 | Lubart et al. |
| 2002/0127565 A1 | 9/2002 | Cunningham et al. |
| 2002/0180909 A1 | 12/2002 | Lubart et al. |
| 2004/0233354 A1 | 11/2004 | Uehara et al. |
| 2005/0018103 A1 | 1/2005 | Lubart et al. |
| 2005/0088717 A1 | 4/2005 | Clikeman et al. |
| 2005/0134769 A1 | 6/2005 | Mi |
| 2005/0140846 A1 | 6/2005 | Lubart et al. |
| 2005/0185416 A1 | 8/2005 | Lee et al. |
| 2005/0259198 A1 | 11/2005 | Lubart et al. |
| 2005/0270798 A1 | 12/2005 | Lee et al. |
| 2006/0023289 A1 | 2/2006 | Clikeman et al. |
| 2006/0086383 A1 | 4/2006 | Ruelle et al. |
| 2006/0291067 A1 | 12/2006 | Davis et al. |
| 2007/0133097 A1 | 6/2007 | Lubart et al. |
| 2007/0137691 A1* | 6/2007 | Cobb et al. .................. 136/246 |
| 2007/0153396 A1 | 7/2007 | Lubart et al. |
| 2008/0144182 A1 | 6/2008 | Lubart et al. |
| 2009/0073570 A1 | 3/2009 | Lubart et al. |

FOREIGN PATENT DOCUMENTS

| | | |
|---|---|---|
| CN | 1136349 A | 11/1966 |
| CN | 1135797 A | 11/1996 |
| CN | 1220002 A | 6/1999 |
| CN | 1488956 A | 4/2004 |
| JP | 50145941 | 11/1975 |
| JP | 51002044 | 1/1976 |
| JP | 08221013 | 8/1996 |
| JP | 9114003 A | 5/1997 |
| JP | 09505412 | 5/1997 |
| JP | 2005092177 A | 4/2005 |
| JP | 2005249450 | 9/2005 |
| RU | 15941 U1 | 11/2000 |
| SU | 884422 A | 2/1983 |

| | | | |
|---|---|---|---|
| WO | WO 95/14255 A1 | 5/1995 |
| WO | WO 96/35971 A3 | 11/1996 |
| WO | WO 97/36131 A1 | 10/1997 |
| WO | WO 98/21626 A1 | 5/1998 |
| WO | WO 98/36315 A1 | 8/1998 |
| WO | WO 01/57559 A1 | 8/2001 |
| WO | WO 2004/036294 A3 | 4/2004 |
| WO | WO 2004/104677 A2 | 12/2004 |
| WO | WO 2006/020610 A3 | 2/2006 |
| WO | WO 2009/108896 A1 | 9/2009 |

OTHER PUBLICATIONS

International Search Report and Written Opinion dated Sep. 28, 2006 for PCT/US2005/28217.

International Search Report dated Apr. 28, 2009 for PCT/US2009/035560.

International Search Report dated Jun. 21, 2000 for PCT/US00/02625.

* cited by examiner

CONCENTRATORS FOR SOLAR POWER GENERATING SYSTEMS

CROSS-REFERENCE TO RELATED APPLICATIONS

This application claims priority under 35 U.S.C. §119(e) to U.S. Provisional Patent Application Ser. No. 61/031,750, filed Feb. 27, 2008, and U.S. Provisional Patent Application Ser. No. 61/095,357, filed Sep. 9, 2008, the disclosure of which are incorporated by reference in its entirety.

A. FIELD OF THE INVENTION

The invention generally relates to solar power generating systems. In particular, the invention relates to solar concentrators for use with solar photovoltaic power generating systems and/or solar thermal power generating systems.

B. BACKGROUND

Solar collectors include photovoltaics where sunlight is converted directly to electricity, solar thermal energy used to heat water, and large scale solar thermal power plants used to generate electricity. In these systems, solar energy is "collected" by placing panels or arrays of panels in the direct path of the sun. These panels are composed of mirrors or mirror-like material to reflect solar energy to a specific point for collection, or are made up of a variety of absorbent materials. Systems where absorbent materials are used can further be divided into systems where solar energy is collected in cells or where solar energy is absorbed as thermal energy to heat either water or a heat-transfer fluid, such as a water-glycol antifreeze mixture. Most commercially available solar cells are made from wafers of very pure monocrystalline or polycrystalline silicon. Such solar cells typically can attain efficiencies of up to 18% in commercial manufacture. The silicon wafers used to make them are relatively expensive, making up 20-40% of the final module cost. The alternative to these "bulk silicon" technologies is to deposit a thin layer of semiconductor onto a supporting material such as glass. Various materials can be used such as cadmium telluride, copper-indium-diselenide and silicon. There are basically three types of thermal collectors: flat-plate, evacuated-tube, and concentrating. A flat-plate collector, the most common type, is an insulated, weatherproofed box containing a dark absorber plate under one or more transparent or translucent covers. Evacuated-tube collectors are made up of rows of parallel, transparent glass tubes. Each tube consists of a glass outer tube and an inner tube, or absorber, covered with a selective coating that absorbs solar energy well but inhibits radiative heat loss. The air is withdrawn ("evacuated") from the space between the tubes to form a vacuum, which eliminates conductive and convective heat loss. Concentrating collector applications are usually parabolic troughs that use mirrored surfaces to concentrate the sun's energy on an absorber tube (called a receiver) containing a heat-transfer fluid.

Most existing solar photovoltaic power generating systems generally do not use a primary concentrator because concentrating the sunlight would increase the temperature of the photovoltaic cell and significantly reduce its efficiency of conversion. A solution to this problem is to use a cooling system for the photovoltaic cell. But such a solution is considered expensive if low efficiency, inexpensive, solar photovoltaic cells are used. Another solution is to use more efficient, but more expensive, solar photovoltaic cells while reducing the area of solar photovoltaic cells required to generate a desired power output by using one stage of concentration. Depending on the amount of concentration achieved, this would lower the cost for the solar photovoltaic cells significantly while allowing for the added cost of the cooling system. An added benefit for the increase in illumination is a further increase in the efficiency of conversion of the solar photovoltaic cell.

Existing solar thermal power generating systems that are used to generate electricity generally already use one stage of concentration of the solar energy. That is, solar energy is focused by a collector directly onto a receiver. The concentration of the solar energy at the receiver allows for elevated temperature at the receiver analogous to a magnifying glass. The smaller the area into which the light is focused in a one-stage concentrator, the higher the temperature that the receiver can reach and the higher the apparent efficiency. However, the volume of the receiver must be fixed so that the receiver has a sufficiently sized reservoir to generate the designed power from the system. This, in turn, means that only a small part of the surface area of the receiver is heated from the energy of the sun while the remainder of the area loses energy. This leads to a decline in effective efficiency, as the hot reservoir of the system cannot reach an equilibrium temperature that is the same as that reached by the smaller illuminated area of the receiver. It is necessary to distribute the energy symmetrically over the receiver as well as simultaneously focusing the energy. The temperature of the reservoir of the receiver determines the efficiency of the system and ultimately, the power that can be extracted from the solar energy collected. The temperature of the reservoir as a whole must be elevated if additional power is to be generated by the system above that originally specified.

Accordingly, there is a need for solar concentrators that provide high efficiency of concentrations and conversion of solar energy.

C. SUMMARY

The invention relates to concentrators for solar photovoltaic power generation systems and solar thermal power generation systems. In solar photovoltaic power generation system the concentrator is a primary concentrator. The primary stage of concentration allows significant reduction in the required area necessary to produce a given level of power relative to the area of solar photovoltaic cells required in the absence of a concentrator. This in turn allows for the use of a cooling system.

A solar thermal power generation system may be developed that includes a second stage of concentration that permits the temperature of a reservoir as a whole to be elevated. The second stage concentrator not only traps photons but also allows insulation of the remainder of the area out of which the light is focused so that loss of energy from this area of the receiver is significantly reduced. Accordingly, increases in the temperature of the receiver may be translated into higher efficiency in converting solar power to electrical power than with current systems, leading to the generation of substantially more power than current systems can generate for existing designs of a given collection area.

The invention is directed to a system for concentrating solar radiation. The system includes a first structure having a first reflective side and a second reflective side and a second structure having a first reflective side and a second reflective side. The second reflective side of the first structure and the first reflective side of the second structure are spaced apart to form a concentrator having an input end for collecting infrared, ultraviolet and visible light and an output end for transferring the collected light. The concentrator may be hollow. The input end and the output end of the concentrator may be air. The concentrator may be a compound parabolic concentrator, a circular approximation of a compound parabolic concentrator, a compound parabolic concentrator having a linear portion, or a circular approximation of a compound parabolic concentrator having a linear portion. The system may include a plurality of first structures and second structures to form multiple concentrator for use in solar thermal generating systems or solar photovoltaic generating systems. The first structure and the second structure may be a metal, polymer, metal composite, polymer composite, or a combination thereof having a reflective boundary thereon. The first structure and the second structure further may be an internal thermal insulating material.

Another embodiment of the invention includes a system for concentrating light. The system includes a plurality of concentrating regions. Each concentrating region includes an input end having a perimeter or width in a lenticular configuration, an output end having a perimeter or width in a lenticular configuration, and a portion located therebetween defined by a reflective boundary.

The perimeter or width of the input end of the concentrating region may be greater than the perimeter or width of the output end of the concentrating region. The plurality of the concentrating regions may be adjacent each other such that the input ends of the concentrating regions are in fluid communication. The light entering or hitting the reflective boundary may be concentrated through the output end of the concentrating region. The input end, the output end and the portion located between the input end and the output end defined by a reflective boundary may be in air. The concentrating region may be a compound parabolic concentrator, a circular approximation of a compound parabolic concentrator, a compound parabolic concentrator having a linear portion, or a circular approximation of a compound parabolic concentrator having a linear portion. The system may further include a solar photovoltaic material or a receiver pipe located at the output end of the concentrating region. The reflective boundary may have a reflectivity of at least 90%, preferably at least 95%.

Another embodiment of the invention includes a method of manufacturing a light collection system. The method includes forming a film having multiple recesses. Each recess includes an input end, an output end and a reflective boundary. The output end has a smaller perimeter or a width in a lenticular configuration than a perimeter or a width of the input end in the lenticular configuration. The method also includes placing the output ends of the recesses of the film onto a solar collecting material or pipe receiver so that the light entering the input end of the recess or hitting the reflective boundary of the recess is concentrated through the output end on the solar collecting material.

The input end of the recesses may be in fluid communication with each other. The input end and the output end may be in air. The film may be a metal, polymer, metal composite, polymer composite, or a combination thereof having a reflective boundary thereon. The recess may be a compound parabolic concentrator, a circular approximation of a compound parabolic concentrator, a compound parabolic concentrator having a linear portion, or a circular approximation of a compound parabolic concentrator having a linear portion. The recess may include a material. The method may further include the step of collecting infrared, ultraviolet and visible light through the input end of the recesses.

D. BRIEF DESCRIPTION OF THE DRAWINGS

Aspects, features, benefits and advantages of the present invention will be apparent with regard to the following description and accompanying drawings, of which:

E. DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art. As used herein, the term "about" means plus or minus 10% of the numerical value of the number with which it is being used. Therefore, about 50% means in the range of 45%-55%.

The invention generally relates to solar collectors for uses in solar power generating systems. In particular, the invention is directed to concentrators composed of air or a hollow region having a modified CPC structure and a boundary of reflecting material that results in high solar energy conversion. The concentrator of the invention may be a primary stage concentrator for use in solar photovoltaic power generating systems or may be a second stage concentrator for use in solar thermal power generating systems. While the terms concentrator, concentrating region, primary stage concentrator and second stage concentrator are used throughout herein, it is understood that the concentrator of the invention may at least be used as either a primary stage concentrator in a photovoltaic solar generating system or as a second stage concentrator in a solar thermal generating system, and use of the terms may be used interchangeably herein and is not meant to limit the scope of the invention.

Figure 1:
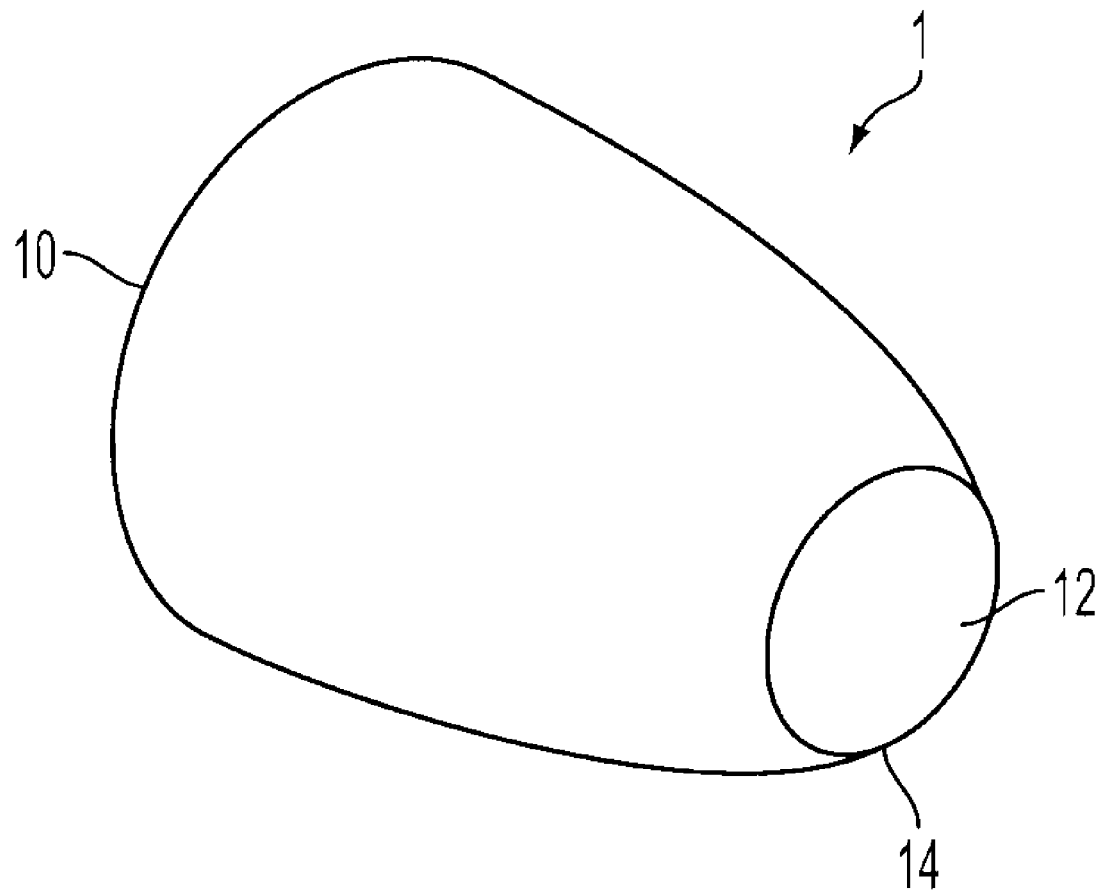
FIG. 1 depicts a concentrator according to an embodiment of the invention.

The concentrator of the invention as described herein may be a hollow region composed of air and may be formed from reflective boundary surfaces of adjacent structures. However to help assist in understanding the structure of the concentrator of the invention, FIG. 1 has been included to illustrate the concentrating region or "shell" 1 of a concentrator. The concentrator may be a compound parabolic concentrator (CPC) configuration, such as for example, a CPC design, a circular approximation of a CPC, a modified CPC structure having a curved portion and a linear portion, parabolic, linear, curved, curvilinear, or the like. The configuration of the concentrator is designed for maximizing collection and concentration of solar energy and allows for the transmission of all wavelengths of sunlight, ultraviolet, visible and infrared to for example, the photovoltaic material. The CPC structure of the concentrator of the invention may be made with a thickness of about 0.1 mm to about 100 mm. Additionally a CPC structure or shaped lens of the invention allows for a maximum acceptance angle for a given or desired concentration.

The concentrating region 1 includes an input end 10, an output end 12, and an outer boundary 14 surrounding a collection area A (see FIG. 2) of air. The input end 10 has a larger perimeter or width depending on the design than the perimeter or width of the output end 12 to maximize collection of solar energy. In use, sun light enters the input end 10 in air into collection area A in air so that it can exit the output end 12 in air in a concentrated form. Light that enters the input end but does not exit the output end directly, bounces or reflects off the outer boundary of the concentrator to then exit at the output end.

Figure 2:
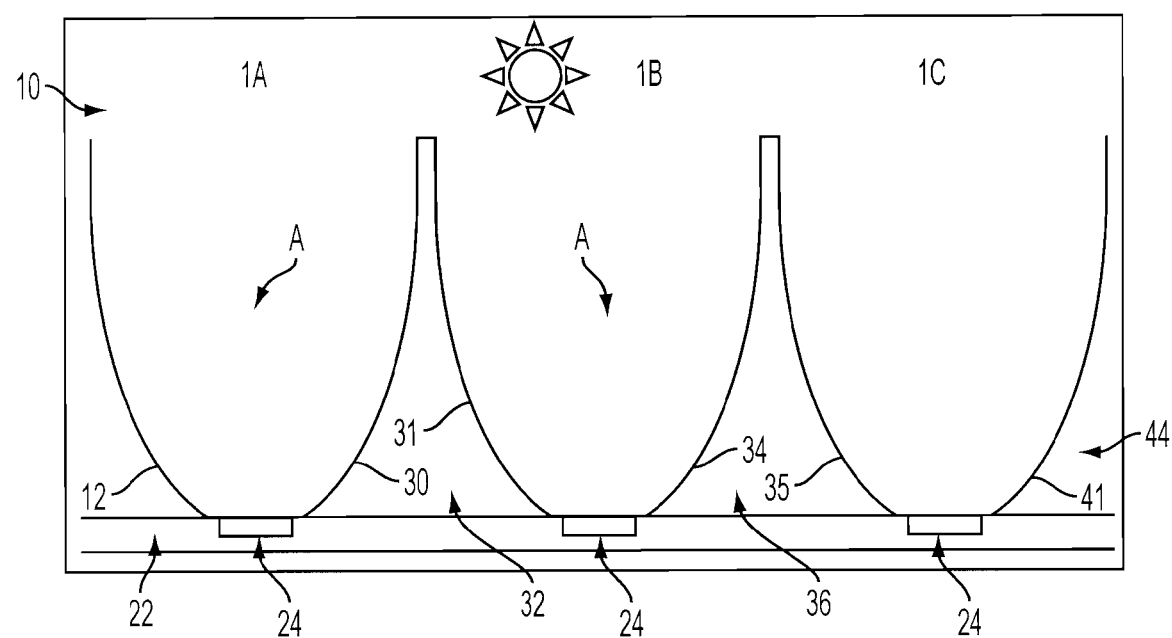
FIG. 2 depicts a side view an embodiment of primary stage concentrators in a solar photovoltaic power generating system.

FIG. 2 illustrates the concentrator of the invention. The concentrator is formed by outer reflective boundaries of adjacent structures. FIG. 2 illustrates two complete structures, first structure 32 and second structure 36 and three concentrators 1A, 1B and 1C. The first structure 32 has a first reflective boundary 30 and a second reflective boundary 31. The second structure 36 has a first reflective boundary 34 and a second reflective boundary 35. The concentrating region 1B having collection area A is formed by the second reflective boundary 31 of the first structure 32 and the first reflective boundary 34 of the second structure 36. In preferred embodiments, the top of the structures are of a minimum width so as to minimize the dead space between the input ends thereby allowing a maximum amount of light to be collected in the collection area. The bottom edge of the second reflective surface 31 of the first structure 32 is spaced apart from the bottom edge of the first reflective surface 34 of the second structure 36 to form the output end 12 of the concentrator 1B. Additionally the second reflective boundary 35 of the second structure 36 and a first reflective boundary 41 of a third structure 44 form concentrator 1C and illustrates in FIG. 2 the concentrators may be located on a carrier layer 22 with the output ends of the concentrating regions placed or aligned with a solar photovoltaic material layer 24. In relation to FIG. 1, the outer reflective surfaces 31 and 34 form the inner boundary 14 of the concentrating region 1, with the reflective surfaces being utilized to contain the solar light within the concentration areas A to maximize the light collection in the full wavelength of light. The number of structures may vary so as to obtain the desired number of concentrators. In embodiments, multiple structures are placed in varying configurations to form the concentrating regions of the invention. In preferred embodiments, the structures are placed in rows and columns to form a contiguous pattern for example, an egg carton pattern, to result in numerous concentrating regions.

The structures may be made of any material, so long as the outer surface is reflective. In an embodiment the structures may be metal for example, aluminum, silver, titanium dioxide and the like. Preferably the material provides at least 90% reflectivity, more preferably at least 95% reflectivity. In other embodiments, the structures may be a polymer material or a composite with a reflective, material layer or coating on the outer surfaces of the structures. Accordingly the reflective surfaces of the structures minimize energy loss as it absorbs minimal light. In embodiments the bottom surface of the structures may attach to a carrier material, photovoltaic material or any other material layer. Alternatively if the structures are hollow the solid portions of the structures may attach to a carrier layer or the like.

Additionally, the structures may be solid, hollow or a combination thereof. The structures may also include a solid reflecting material, such as a metal, and/or may be at least partially filled with a thermally insulating material, especially for use in solar thermal applications In alternate embodiments, the outer reflective surfaces of the structures may be composed of thin walls. These thin walls may then be attached to an exterior or top surface of the solar photovoltaic material/cells. The thin wall of the metal may not extend the full length on the top surface of the solar photovoltaic cells but may preferably be of a sufficient length so that any light reflecting from the solar photovoltaic cells can and will be recycled back to the cells.

In preferred embodiments the structures are configured to allow, the input ends of each concentrating region to be in fluid communication with each other. Alternatively, the input end of a concentrator may be adjacent the input end of another concentrator, such that a portion of the input end of a concentrator is at least in contact with a portion of the input end of another concentrator. In yet another embodiment, the input ends of multiple concentrators may be separated by a material therebetween. In preferable embodiments, the input ends of the concentrators are as close as possible to capture a maximum amount of solar energy in the respective collection areas. In such embodiments, the tops of the structures are preferably tips, rather than flat areas, so as to maximize the collection area.

Figure 3:
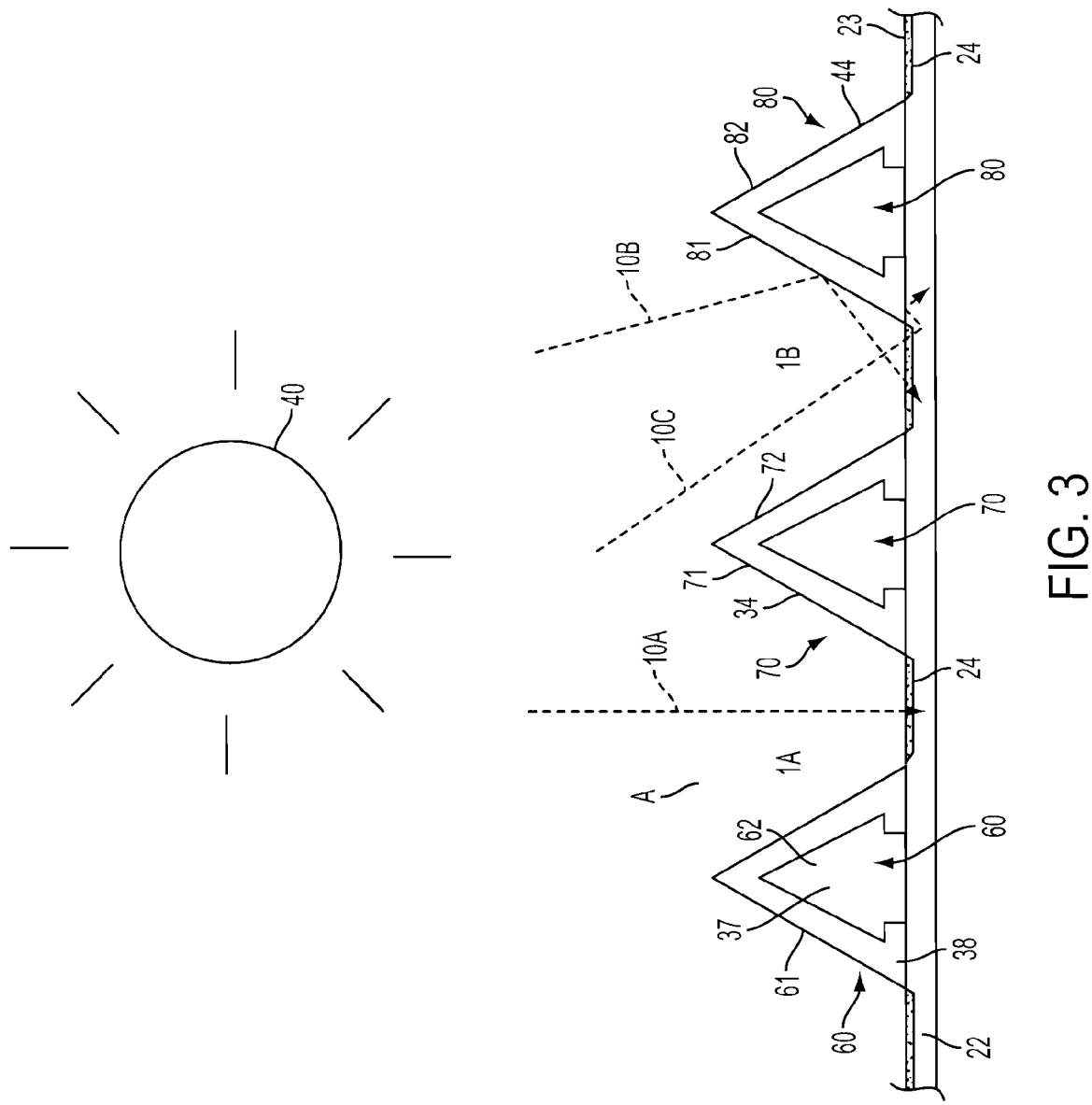
FIG. 3 depicts another embodiment of primary stage concentrators in a solar photovoltaic power generation system.

FIG. 3, illustrates another embodiment of the concentrators of the invention. FIG. 3 illustrates three structures, 60, 70, and 80 that form two concentrators 1A and 1B. Structure 60 includes a first reflective surface 61 and a second reflective surface 62; structure 70 includes a first reflective surface 71 and a second reflective surface 72; and structure 80 includes a first reflective surface 81 and a second reflective surface 82. In this embodiment, the structures 60, 70, and 80 are located on the carrier layer 22 of the photovoltaic system. First structure 60 may be located in close proximity to second structure 70 such that the output end of the concentrating region is formed. Accordingly the second reflective surface 62 of the first structure 60 and the first reflective surface 71 of the second structure 70 forms the concentrating region 1A. In this instance, the structures are shaped such that the formed concentrator has linear boundaries surrounding the collection area A of air.

FIG. 3 illustrates structures 60, 70, and 80 of triangular shapes with a hollow region internally 37 and a flange area 38 located at the bottom. Preferably the structures are located such that they provide a maximum external surface area to allow for the capture of incoming light rays at a maximum acceptance angle, the angle that the light rays make to a line orthogonal to the solar photovoltaic material.

In FIG. 3, the output end of the concentrators are located on a carrier film 22 of a photovoltaic system. The carrier layer 22 further includes photovoltaic material 24 located adjacent the output end of the concentrating regions. During use, the solar light enters the input end 1 of the concentrating regions and is reflected off the inner boundary off the concentrator and is directed towards the output end of the concentrating region and through the photovoltaic material 24.

In embodiments, the concentrator may be formed as a column in a solar thermal application and may be attached to a receiver pipe (not shown) or a structure that surrounds the concentrating region attached to a top surface 23 of the solar photovoltaic material 24, or the solar photovoltaic cells, whose exterior surface absorb the sun light into the interior of the cells. In alternate embodiments, an additional material layer (not shown) may be located on the top surface 23 of the solar photovoltaic material 24 that acts as an antireflection coating so that the light rays do not need to be recycled. For the discussion herein, a column is defined as a finite length or indefinite length. Finite length means that an area of the input end and the output end of the concentrating region can be defined or determined. Indefinite length means areas can not be defined but only the width of the input end and the output end of the concentrating region can be defined which inturn represents a lenticular configuration.

In use, light from a light source 40, such as the sun, may enters the concentrators in the collection area A. For example, light ray 10A from light source 40 may directly hit the top surface 23 of the solar photovoltaic material 24. In this situation, light ray 10A may be directly absorbed into the solar photovoltaic material/cells. Alternatively, light ray 10B, may initially hit an outer reflective surface 81 of structure 80 as shown. Upon hitting the outer reflective surface 81, the light is reflected and then enters through the top surface 23 of the solar photovoltaic material 24 or rather is collected within the solar photovoltaic material/cells. Light ray 10C illustrates another variation. In this situation, light ray 10C enters the top surface of the solar photovoltaic material 24, penetrates a short distance into the solar photovoltaic material 24 before reflecting upwards toward the flange area 39 of structure 80, and is then reflected again such that it enters the top surface 23 of the solar photovoltaic material 24 to be finally absorbed.

Figure 4:
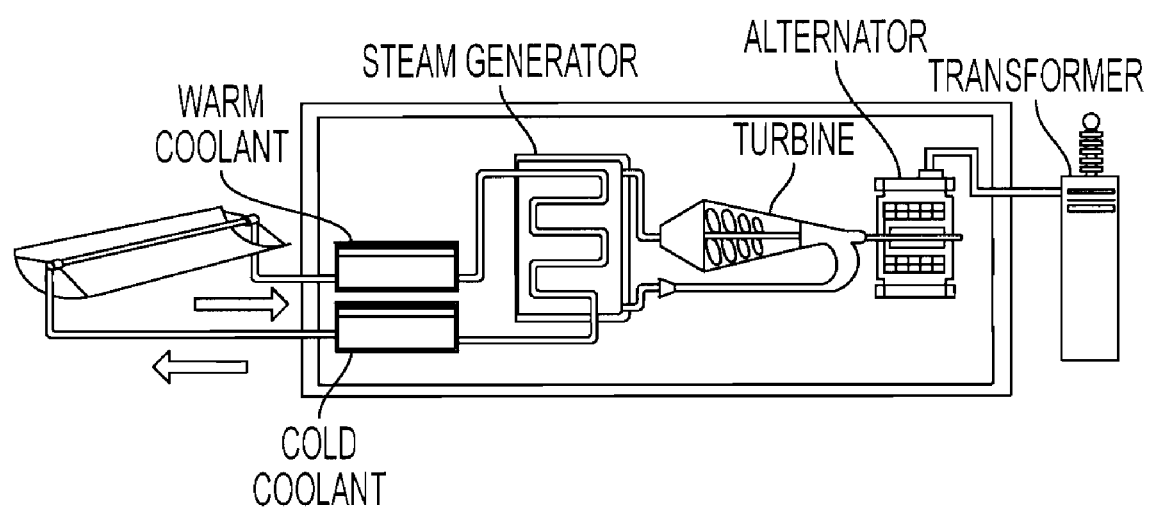
FIG. 4 depicts a schematic of an exemplary solar thermal power generation plant.

FIG. 4 depicts a schematic of an exemplary solar thermal power generation plant according to another embodiment. FIG. 4 depicts a process flow diagram that is representative of the majority of parabolic trough solar power plants in operation today. The collector field may include a large field of single-axis tracking parabolic trough solar collectors and may be modular in nature and is composed of parallel rows of solar collectors aligned on a north-south horizontal axis. Each solar collector may include a linear parabolic-shaped reflector that focuses the sun's direct beam radiation on a linear receiver located at the focus of the parabola. The collectors may track the sun from east to west during the day to ensure that the sun is continuously focused on the linear receiver.

An important parameter in a solar thermal power system is the collection area (A) necessary to generate electric power (P). The relationship is given by:

$$A = P/(I_S * E) \qquad (1)$$

where
  $I_S$ is the local effective solar constant without concentration; and
  E is the effective efficiency of the system in converting solar power to electrical power The collection area is inversely proportional to the efficiency. Increasing the temperature of the working fluid in the solar thermal collection system can raise the efficiency. One method of raising the temperature is to concentrate (or focus) the solar energy by using a parabolic trough or a paraboloid, analogous to a magnifying glass. The analysis herein determines the increase in equilibrium temperature of the input to the receiver (the heat containment/exchange vessel of the system). This can be used to determine any increase in the overall efficiency of the system. In that analysis, the collection area is assumed to be fixed. An exemplary system is described below.

Figure 5:
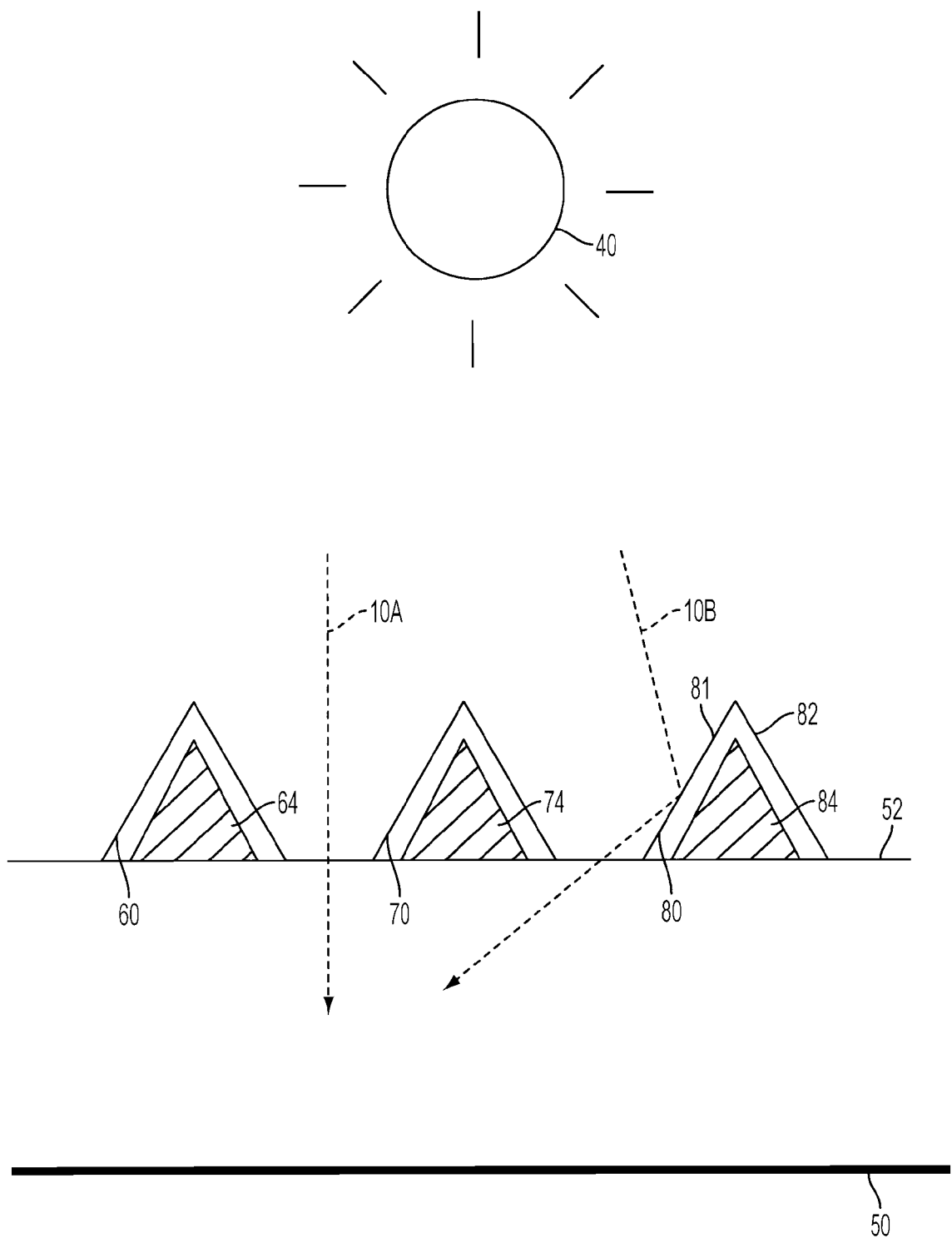
FIG. 5 depicts a side view of an embodiment of second stage concentrators in a solar thermal power generating system.

FIG. 5 depicts an exemplary second stage concentrator formed on a top surface 52 of receiver 50 of a solar thermal power generation system according to an embodiment. Similar structures 60, 70 and 80 as illustrated in FIG. 3 are utilized herein, with the addition that these structures further include an internal thermally insulating material 64, 74, and 84, respectively. Note receiver 50 in FIGS. 5 and 6 may extend beyond the page and the illustration of such is in no manner meant to limit the thickness of the receiver 50. As shown in FIG. 5, the second stage concentrator may be formed as a column attached directly to the receiver of a solar thermal power generation system whose exterior or top surface 52 allows for transmission of the sun light into the interior of the receiver 50. In an embodiment, the cross-section of the second stage concentrator may be triangular; however, other cross-sectional shapes for the second stage concentrator may also be used within the scope of this disclosure. Light from the light source 40, enters the space between the reflecting structures. As shown in FIG. 5, light ray 10A may be transmitted directly to the interior of the receiver 50 while light ray 10B may reflect off of the first reflecting surface 81 of structure 80 prior to entering the interior of the receiver 50.

Figure 6:
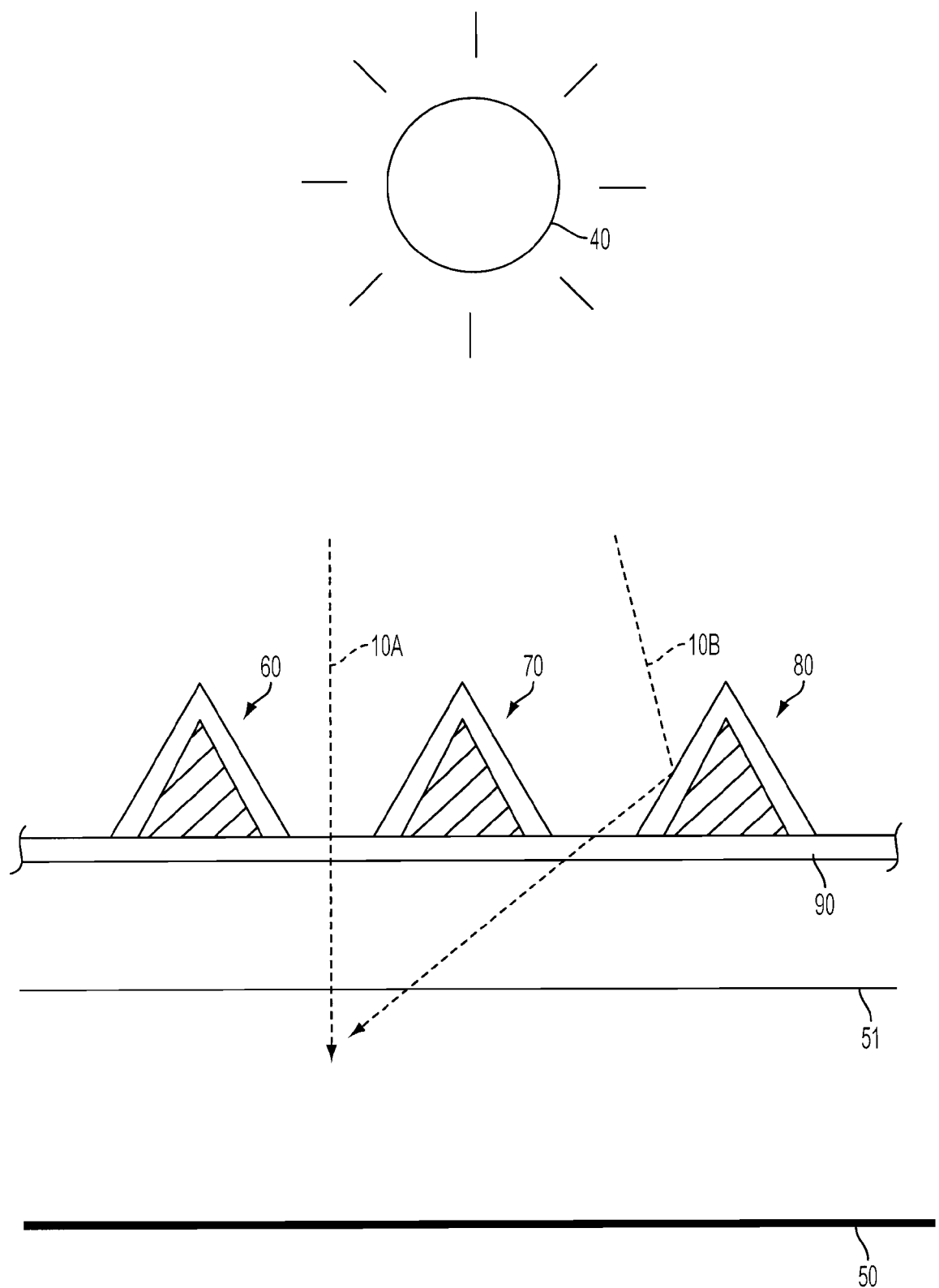
FIG. 6 depicts another embodiment of second stage concentrators in a solar thermal power generating system.

FIG. 6 depicts another second stage concentrator utilized with an alternate solar thermal power generation system according to another embodiment of the invention. As shown in FIG. 6, the second stage concentrator may include a reflecting material (such as metal) and the base of the structures 60, 70, and 80 may be attached to a material 90 having low reflectivity, such as glass. The structures may include a solid reflecting material, such as a metal, and/or may at least have a portion filled with a thermally insulating material 64, 74, and 84 attached to the exterior or top surface of the glass 90. The top surface 51 of the receiver 50 may be located on the opposite side of the material 90 from the structures. In an embodiment, a plurality of layers of low reflectivity material 90 may be interspaced between the structures and the top surface or exterior 51 of the receiver 50. In an embodiment, a plurality of layers of low reflectivity material 90 may surround a vacuum or a partial vacuum. As shown in FIG. 6, light ray 10A may be transmitted through a plurality of layers of low reflectivity material 90 and a vacuum or a partial vacuum, through the top surface 52 and into the receiver 50. Light ray 10B may reflect off of the reflecting structures and traverse the system prior to entering the interior of the receiver 50.

The second stage concentrator may be designed to enhance the performance of the receiver by raising the temperature of the heat transfer fluid that circulates through the receiver to a much higher value than ordinarily could be achieved. The heat transfer fluid may then circulate to heat exchangers in the power block where the fluid is used to generate steam. The steam may then be fed to a conventional steam turbine generator to produce electricity. The high temperature side of the heat transfer fluid may be the hot reservoir side of the steam turbine in which the higher the temperature of the hot reservoir the higher the efficiency of the engine.

Two applications are examined below whereby the use of the second stage concentrator adds performance value. Current systems utilize a single concentrator in which some equilibrium temperature is reached. By introducing a second concentrator into the system, the equilibrium temperature may be increased, resulting in a substantial increase in temperature of the receiver. The increase in equilibrium temperature at the core input area (compared to a system with one stage of concentration) is determined below. Part of the analysis determines the concentration factor for the first stage and is used as input for the second stage analysis.

Alternately, the two-concentrator solution allows a solar thermal system size to be substantially reduced, while maintaining the current receiver temperature. Assuming that the equilibrium receiver temperature of the original system is fixed, the collection area is minimized with the addition of a second stage concentrator equipped second stage of concentration. This introduces the option of a smaller system capable of generating an equal temperature, leading to a lower cost and less space-intrusive solution.

Finally, using the higher receiver temperature (via the second concentrator) leads to an increase in electric power generation for the same collector area. However, the design of the second stage concentrator is changed to maximize efficiency of the system and power generated. It will be shown that the electric power output of the solar thermal power generation system may be by approximately 55% (from about $80 \times 10^6$ Watts in a real world system to about $124 \times 10^6$ Watts in the system described herein).

Primary Concentrator and Second Stage Concentrator Calculations

A device, such as the one described in U.S. Pat. No. 6,473,220 to Clikeman et al., which is incorporated by reference herein in its entirety, describes a device that may be used to focus energy from a large area to a small area and thereby achieve the function of a primary concentrator for solar photovoltaic applications or a second stage concentrator for solar thermal applications. For applications involving solar energy, the primary or second stage concentrator may be constructed of metal with effective reflectivity, r. The effective transmissivity, T, of the primary or second stage concentrator and the fractional opening into the input area (or receiver of the thermal power generating system), F, may be determined from the structure of the concentrator (primary or second stage). F may be determined to be $$F = \sin B/2 / [\sin(2N+1)B/2 - \sin B/2] \quad (2)$$

where

B is the apex angle of the tapered version of the Primary or second stage concentrator structure; and N is the maximum number of reflections for collimated light from entering to exiting the primary or second stage concentrator structure.

The transmissivity, T, is given by $$T = F(1+F) + [r/\{N(1+F)\}][(1-r^N)/(1-r)]. \quad (3)$$

To maximize temperature or reduce the area required for the solar photovoltaic cells, the concentration factor must be maximized. Minimizing F and maximizing N may be shown to maximize the concentration factor. A typical primary or second stage concentrator has a value for B of approximately 5° and a value of r between about 90% (0.90) and about 95% (0.95). The minimum value of N is 2, and the maximum value for N ($N_{MAX}$) may be determined by computing $$(2N_{MAX}+1)(B/2) \leq 90° \quad (4)$$

so that $N_{MAX}$ is equal to 17 for the assumed value of the apex angle B (i.e., 5%). For this case, if r is chosen to be 0.90, F equals 0.046 and T equals 0.466. The concentration factor for this design (=T/F) is 10.13. For such a design, the primary concentrator would allow a reduction in solar photovoltaic area of about 95.4% [=100 (1−F)]. These values are used in the solar thermal calculations performed herein.

To maximize efficiency, T must be increased to be as large as possible while maintaining a high degree of concentration. If B is approximately 5°, r is 0.95 and N is 3, F may be shown to be equal to 0.170 and T may be equal to 0.917. These values are alternately used in the calculations performed herein.

Finally, a tapered version of a primary or second stage concentrator may be assumed for the calculations. Such a primary or second stage concentrator may be represented in analytic form. A primary or second stage concentrator design based on a modified Compound Parabolic Collector (CPC) structure as utilized herein with a linear section adjacent the input of the concentrator has a higher degree of concentration for a given design than the tapered version. However, the CPC may be represented only numerically and not in a closed analytic form. In other words, a CPC design is not open to mathematical analysis by equation.

Temperature Equilibrium Calculations for the Solar Thermal Application

Because the net power output (P) and solar field area (A) for a given plant are known, the local effective solar constant without concentration may be computed if the efficiency of the system is also known. The efficiency of the system (E) may be estimated in the following way. The efficiency may be viewed as including two components. The first component is the efficiency of the receiver interface ($\eta_R$). The second component is the efficiency of the conversion of the thermal power representing the hot reservoir at the receiver to the final electrical power output. This efficiency may be assumed to be approximated by a Carnot engine ($\eta_C$) operating between the temperature of the hot reservoir and the calculated temperature of the required cold reservoir. Alternate models may be used within the scope of this invention, such as a Rankine engine. The efficiency of the system may be expressed as $$E = \eta_R * \eta_C \quad (5)$$

At the receiver interface, the radiation into and out of the system is equal in thermal equilibrium such that $\eta_R$ is equal to 0.5. A typical value for $\eta_C$ (Private Communication) is approximately 35% (0.35). Using these values, E may be computed to be 0.175. For a real world system having a collection area, A, equal to 464,340 m² and a power generation, P, equal to $80 \times 10^6$ Watts, the value of E may be substituted into equation (1) to determine the local effective solar constant ($I_S \cong 1.0 \times 10^3$ W/m²).

For a second stage concentrator equipped system, the efficiency of the first stage, $\eta_R$, may be determined by $$\eta_R = 0.5T \quad (6)$$

where T is the effective transmissivity of the second stage concentrator.

The temperature of the cold reservoir, $T_C$, of a Carnot engine of 35% efficiency with a hot reservoir temperature, $T_H$, as given for an exemplary plant of 663° K. may be computed by determining $$\eta_C = 1 - (T_C/T_H) \quad (7)$$

By substitution, $T_C$ may be determined to be approximately 431° K. Thus, the efficiency of the system may be defined as $$E = 0.5T * [1-(T_C/T_H)] \quad (8)$$

The power generated by the solar thermal power generation system may then be calculated from equation (1) by the following:

$$P = I_S * A * 0.5 * T * [1-(T_C/T_H)]. \quad (9)$$

where the cold reservoir temperature, $T_C$, may be assumed to be 431° K.

The first set of calculations listed below may be used to maximize the equilibrium temperature, rather than maximize efficiency. The basic equation for such a determination arises from solving the Stefan-Boltzmann Equation where the input is the solar energy and the output is the loss from thermal emittance. The temperature equilibrium after one stage of concentration is the same as the receiver temperature that is the hot reservoir temperature of the Carnot engine ($T_H = T_{EQ1}$) for a system without a second stage concentrator. The basic relationship is given by $$I_{EFF1} = \sigma \epsilon (T_{EQ1})^4 \quad (10)$$

where
- $\sigma$ is the Stefan-Boltzmann constant=$5.6996 \times 10^{-8}$ W/m² °K⁴;
- $\epsilon$ is the emissivity of the glass envelope (approximately 0.88); and
- $I_{EFF1}$ is the effective solar constant after one stage of concentration.

$I_{EFF1}$ may also be determined by computing $$I_{EFF1} = I_S \alpha \gamma; \tag{11}$$

where
- $I_S$ is the local effective solar constant without concentration calculated above to be (i.e., approximately $1.0 \times 10^3$ W/m²);
- $\alpha$ is the absorptivity of the glass envelope (approximately 0.96); and
- $\gamma$ is the concentrating factor of parabolic trough.

Accordingly, by substitution of equation (11) into equation (10), $$\gamma = [\sigma \epsilon (T_{EQ1})^4]/I_S \alpha \tag{12}$$

For solar thermal power systems, $T_{EQ1}$ may be approximately 663° K. The concentration factor, $\gamma$, may be calculated from equation (12) to be approximately 10.1. The concentration factor may be used in the calculation for the equilibrium temperature, $T_{EQ2}$, which may be reached by a system with two stages of concentration.

$$I_{EFF2} = I_{EFF1} \beta I_T = \sigma \epsilon (T_{EQ2})^4 \tag{13}$$

where
- $\beta$ is the concentrating effect of second stage concentrator;
- $I_T$ is the effect of losses through the second stage concentrator thermal insulator and through open areas between structures shown in FIG. 2 ($0 \leq I_T \leq 1$), where $I_T = 1$ means no losses;
- $\gamma$ is the concentrating factor of parabolic trough (approximately 10.1); and
- $I_{EFF1}$ is the output (W/m²) from the first stage of concentration as second stage input.

The second stage concentrator may have a second stage concentration factor defined as $$\beta = (1+F)T/F \tag{14}$$

such that substituting in equation (13) may result in $$I_{EFF2} = I_{EFF1} I_T (1+F)T/F \tag{15}$$

where
- F is the fractional opening into the input area, where the insulated area is normalized to one; and
- T is the effective transmissivity, where both terms are calculable Second Stage Concentrator design parameters.

Finally, substituting equation (15) into equation (13) yields $$T_{EQ2} = [I_{EFF1} I_T (1+F)T/\sigma \epsilon F]^{1/4} \tag{16}$$

Second stage concentrator design parameters may be selected such as F approximately equal to 0.046 and T approximately equal to 0.466. $I_{EFF1}$ may then be calculated from equation (10) or (11). The results for equilibrium temperatures, $T_{EQ2}$, are listed below in Table 1 for three chosen values of $I_T$ (1.0, 0.8 and 0.6).

TABLE 1

| $I_T$ | 1.0 | 0.8 | 0.6 |
|---|---|---|---|
| $T_{EQ2}$ (° K) | 1196 | 1133 | 1053 |
| $T_{EQ2}$ (° C.) | 923 | 858 | 780 |

The calculations performed below may demonstrate the ability to minimize the collection area using the techniques disclosed herein. The final equilibrium temperature after two stages of concentration, $T_{EQ2}$ (approximately 663° K.), may be used as an input to the second stage of concentration in the above calculation. The relative reduction factor in required collection area may then be the ratio of the original concentrating factor of parabolic trough to the new concentrating factor ($\gamma/\gamma_N$). The new required concentrating factor of the parabolic trough, $\gamma_N$, is determined by $$\gamma_N = [(F \sigma \epsilon)^* (T_{EQ2})^4]/[T(1+F)I_T I_S \alpha] \tag{17}$$

where
- $I_S \alpha \gamma_N$ has been substituted for $I_{EFF1}$ in equation (16); and
- $T_{EQ2}$ is 663° K.

Assuming $I_T$ is 0.6, the effect of losses through the second stage concentrator thermal insulator is 40%. All the other values of the parameters in the equation are the same as given above ($\sigma = 5.6996 \times 10^{-8}$, $\epsilon = 0.88$, $\alpha = 0.96$, $I_S \cong 1.0 \times 10^3$, F=0.046, and T=0.466).

As such, $\gamma_N$ is approximately equal to 1.59. Since $\gamma = 10.1$ was the original value for the concentration factor, the collection area of the parabolic trough may be reduced by a factor of approximately 6.36 or by 84.3% to 15.7% of its' original size. Using a second stage of concentration allows the equilibrium temperature at the input to the heat containment/exchange vessel to be the same 390° C. as for the system with only one stage of concentration while significantly reducing the collection area.

In an alternate embodiment, in which the goal is to maximize power output while maintaining the area of the collector, the overall efficiency of the system must be maximized in order to maximize power. The overall efficiency depends on two efficiency parameters as shown in equation (5) and is given in equation (8) as $$E = \eta_R^* \eta_C = 0.5T^*[1-(T_C/T_H)] \tag{18}$$

For a system without a second stage concentrator, T is approximately 1, $T_H$ and $T_{EQ1}$ are each approximately equal to 663° K., and $T_C$ is approximately 431° K. As such, E is equal to 0.175, as previously calculated.

For a system including a second stage concentrator, both effective transmissivity T and hot reservoir temperature $T_H (=T_{EQ2})$ may be determined by the choice of the second stage concentrator design. The cold reservoir temperature, $T_C$, may be unaffected by the second stage concentrator and fixed at 431° K. Choosing a specific second stage concentrator design and applying the above methods may permit calculation of $T_{EQ2}$ and the efficiency ($\eta_C$) of the Carnot engine part of the system. Using equation (18) above enables computation of the efficiency, E, of a second stage concentrator equipped solar thermal power system.

For a second stage concentrator design in which T is approximately equal to 0.917, F is approximately equal to 0.170, and the first stage concentration factor, $\gamma$, is approximately equal to 10.1, $T_{EQ2}$ ($=T_H$) may be determined from known coefficients after substituting equation (11) into equation (16) to give $$T_{EQ2} = T_H = [I_S \alpha \gamma I_T (1+F)T/\sigma \epsilon F]^{1/4} \tag{19}$$

Values of $T_H$ ($=T_{EQ2}$), the hot reservoir temperature, may be calculated for the same values of $I_T$ (the effect of losses through the second stage concentrator thermal insulator and through open areas between structures shown in FIG. 3) as in the table above, and used to compute system efficiency from equation (18). This yields

TABLE 2

| $I_T$ | 1.0 | 0.8 | 0.6 |
|---|---|---|---|
| $T_{EQ2}$ (° K) | 1051 | 994 | 925 |
| E | 0.271 | 0.260 | 0.245 |

The efficiency, E, of the solar thermal power generation system was determined above to be 0.175. This may be compared to any of the efficiencies calculated in the table for a second stage concentrator equipped system. For example, in the case where no loss occurs through the second stage concentrator thermal insulator and through open areas between structures shown in FIG. 3 ($I_T$=1.0), the efficiency may be approximately 54.9% higher than the original system. In other words, a second stage concentrator equipped system designed according to an embodiment may generate approximately 54.9% more power than the original system using the same collector area. For the real world system described above, it may be concluded that the electric power output of the system may be raised from a reported $80 \times 10^6$ Watts to about $124 \times 10^6$ Watts.

Construction of the Second Stage Concentrator and the Thermal Insulating Layer

Using the second stage concentrator design, sunlight may be wave-guided to cover as much of the receiver surface as required for the application. The second stage concentrator itself may be constructed of a highly reflective metal with structures in the millimeter to centimeter range that may be stamped. The remainder of the receiver surface may be covered by a thermal insulating material. The efficiency of the receiver interface may depend on the heat loss through the receiver surface covered by the thermal insulating material. This, in turn, may determine the receiver temperature and the efficiency of the Carnot engine equivalent for the interior of the receiver. The thermal insulating material may be a ceramic, such as alumina or zirconia. The ceramic material may rest on glass enclosing a vacuum that surrounds a metal pipe that encloses water (or some other working liquid, such as molten salt) under pressure. The percentage of the incident light available to be transmitted through the opening may be specified. High temperature receivers in solar thermal applications capable of receiving temperatures as high as 778° C. (1051° K.) may include a combination of graphite and quartz (which have an operating temperature in the range of 1000 to 2000° C. The second stage concentrator structure itself may be constructed of alloy steel because it may be separated from the high temperature receiver by filling the structure with lightweight insulating materials. The alloy steel may satisfy the simultaneous requirements for both a higher temperature capability than aluminum and high reflectivity.

Using the second stage concentrator for a second stage of concentration may enable a solar thermal power generating system to reach significantly higher equilibrium temperatures than a conventional one-stage (i.e. Single Concentrator) solar thermal power generation system. This may lead to significantly higher efficiencies in the generation of electric power for a second stage concentrator equipped solar thermal power generation system than for a conventional system having the same collector and receiver area.

Additionally, using a primary concentrator for a first stage of concentration may enable a solar photovoltaic power generating system to reach significantly higher efficiencies than a conventional solar photovoltaic power generation system since higher solar illumination that results from the concentration is known to lead to higher solar conversion efficiencies. This leads to significantly smaller required area for the solar photovoltaic cells and lowers the cost to generate a given level of electric power compared to a system without a primary concentrator. The significant reduction in area also allows for use of a significantly higher conversion efficiency (2 to 4 times increase) solar photovoltaic material to increase the given level of electric power compared to a system without a primary concentrator while simultaneously reducing cost.

Accordingly the concentrators of the invention provide a number of advantages. Some of which include for example, allowing for a maximum acceptance angle during collection. The uses of a CPC shaped concentrator as described herein allows for a maximum acceptance angle to be achieved. Higher concentration equates to high effective energy and higher efficiency of conversion for, for example, the solar photovoltaic material. Additionally the concentrators described herein reduce the amount of photovoltaic material required for high efficiency performance. Additionally the concentrators allow for the transmission of all wavelengths of sunlight to the photovoltaic material, ultraviolet, visible and infrared. This is because the concentrator of the invention is composed of air and surrounded by a second reflective material.

Although the present invention has been described in considerable detail with reference to certain preferred embodiments thereof, other versions are possible. Therefore the spirit and scope of the appended claims should not be limited to the description and the preferred versions contained within this specification.

The invention claimed is:

1. A system for concentrating light comprising:
a plurality of concentrating regions, wherein each concentrating region comprises an input end having a perimeter or a width in a lenticular configuration, an output end having a perimeter or a width in a lenticular configuration, and a portion located therebetween defined by a reflective boundary,
wherein the perimeter or width of the input end of the concentrating region is greater than the perimeter or width of the output end of the concentrating region,
wherein the light entering or hitting the reflective boundary is concentrated through the output end of the concentrating region, and
wherein the plurality of concentrating regions are adjacent each other such that the input ends of the concentrating regions are in fluid communication.

2. The system according to claim 1, wherein the concentrating region is a compound parabolic concentrator, a circular approximation of a compound parabolic concentrator, a compound parabolic concentrator having a linear portion, or a circular approximation of a compound parabolic concentrator having a linear portion.

3. The system according to claim 1, wherein the system further comprises a solar photovoltaic material or a receiver pipe located at the output end of the concentrating region.

4. The system according to claim 1, wherein the reflective boundary has a reflectivity of at least 90%.

5. A method of manufacturing a light collection system, comprising:
forming a film comprising multiple recesses, wherein each recess comprises an input end, an output end, and a reflective boundary, wherein the output end has a smaller perimeter or a width in a lenticular design than a perimeter or a width of the input end in the lenticular design, wherein the input ends of the recesses are in fluid communication with each other; and placing the output ends of the recesses of the film onto a solar collecting material or pipe receiver, wherein the light entering the input end of the recess or hitting the reflective boundary of the recess is concentrated through the output end on the solar collecting material.

6. The method according to claim 5, wherein the input end and the output end are in air.

7. The method according to claim 5, wherein the recesses are located adjacent each other.

8. The method according to claim 5, wherein the film may be a metal, polymer, metal composite, polymer composite, or a combination thereof having a reflective boundary thereon.

9. The method according to claim 5, wherein the recess is a compound parabolic concentrator, a circular approximation of a compound parabolic concentrator, a compound parabolic concentrator having a linear portion, or a circular approximation of a compound parabolic concentrator having a linear portion.

10. The method according to claim 5, wherein the recesses comprise a material.

11. The method according to claim 5, further comprising the step of collecting infrared, ultraviolet and visible light through the input end of the recesses.

* * * * *